United States Patent [19]

Brookman

[11] 4,089,665

[45] May 16, 1978

[54] DEFLECTING MEANS

[75] Inventor: Donald Brookman, Helsby, England

[73] Assignee: Burvell Canada Company Limited, Toronto, Canada

[21] Appl. No.: 756,835

[22] Filed: Jan. 5, 1977

[30] Foreign Application Priority Data

Sep. 4, 1976 United Kingdom ............ 36735/76

[51] Int. Cl.² ........................................... B01D 45/16
[52] U.S. Cl. ..................................................... 55/457
[58] Field of Search .......................... 55/455, 456, 457

[56] References Cited

U.S. PATENT DOCUMENTS

| | | | |
|---|---|---|---|
| 1,700,261 | 1/1929 | Hawley | 55/455 X |
| 1,703,917 | 3/1929 | Alexander | 55/457 |
| 1,729,390 | 9/1929 | Kamrath | 55/457 X |
| 1,816,633 | 7/1931 | Bull | 55/456 |
| 3,374,857 | 3/1968 | Hutchins | 55/456 X |
| 3,552,102 | 1/1971 | Araki | 55/457 X |
| 3,590,560 | 7/1971 | Pall et al. | 55/457 |

*Primary Examiner*—William A. Cuchlinski, Jr.
*Attorney, Agent, or Firm*—Bacon & Thomas

[57] ABSTRACT

A centrifugal separator for removal of impurities from gases, including deflecting means in an inlet region of the housing of the separator, said deflecting means comprising a central circular body and a plurality of vanes extending from the periphery of said body and having portions bent to extend away from the inlet so as to deflect gases when passed thereover and create a vortex flow in the housing; each of said vanes, prior to the deflecting portion being bent into the deflecting position, including a first outer, arcuate peripheral edge, a second inwardly extending edge running from one end of said outer edge and leading to a third inner arcuate edge extending substantially concentrically and over the same arc as a portion of said outer edge; and a fourth, inwardly extending edge running from the other end of said outer edge and leading to said central body; outer portions of said vanes which include portions of said first and second edges being locatable in the seating means of the separator housing.

8 Claims, 8 Drawing Figures

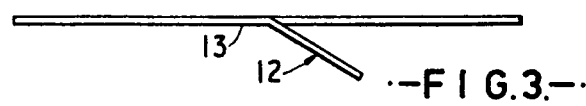
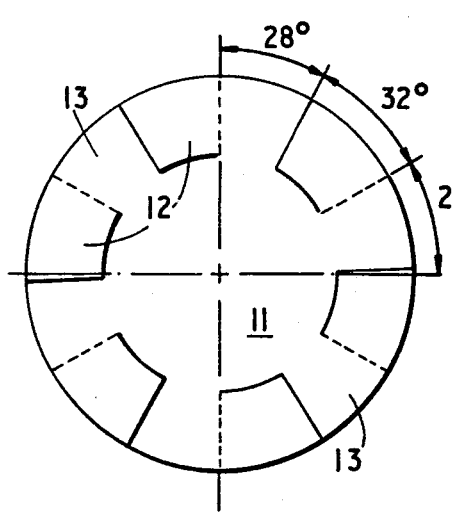
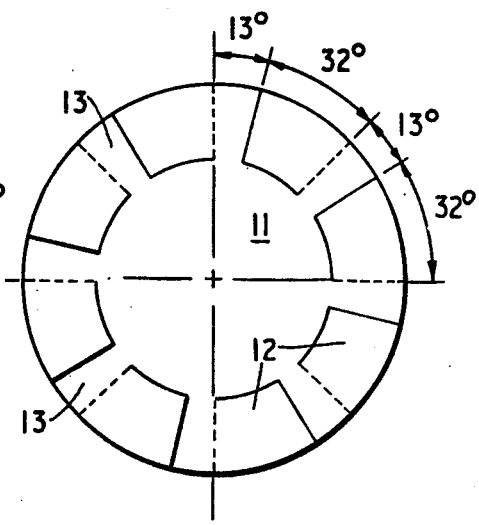
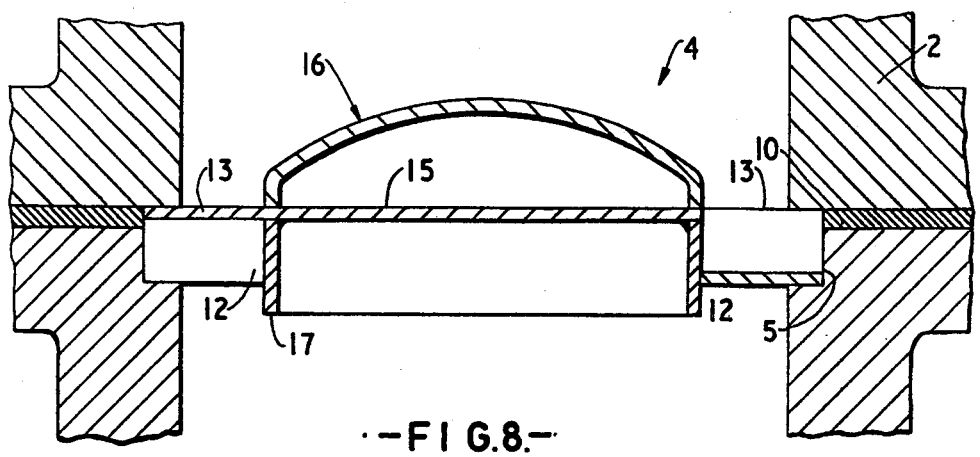

DEFLECTING MEANS

The present invention concerns improved deflecting means for use in centrifugal separators used for the removal of impurities etc. from gases such as for removal of moisture from air.

The separators are of the type in which a centrifugal flow or vortex is created in a chamber by gases passing over inclined vanes of a deflecting means. Particles suspended in the gaseous medium are thus subjected to intense centrifugal forces and move under the action thereof to the walls of the chamber and subsequently flow to a drain means whilst the thus purified or cleaned gas leaves the chamber at an outlet region. Suitable traps including valves and cocks are provided to control the egress of material through the drain means.

Deflecting means provided hitherto have been costly to produce and production thereof is not readily adaptable to different use requirements. A known deflecting means comprises a circular cast-iron member having a flat recessed centre with a plurality of vanes extending therefrom to an integral outer cylindrical wall or mounting portion which is located by force-fit in a recess in the separator housing. Such deflecting member is heavy and costly and production thereof is not readily adaptable to different operational requirements nor is it readily replaceable in the housing.

According to the present invention an improved deflecting means for use in centrifugal separators comprises a central body and a plurality of blades or vanes extending from the periphery of said body and being bent so as to deflect gases when passed thereover in a separator housing to create a vortex flow; the outer, free end of each of said vanes being locatable in the seating recess of a separator housing.

Preferably, at least the vanes are made from a sheet of pressed or rolled metal, such as stainless steel, and preferably cut and bent so that when located in the seating recess and clamped in position therein, the vanes are flexed and held in position in the separator housing by the reactive spring and frictional forces. The central body has a substantially circular periphery and is also preferably of stainless steel and is preferably also domed, by being spun, to improve the flow characteristics thereof.

The vanes are preferably integral with the central body and extend from the periphery thereof by means of an arm portion and are bent to produce the desired vortex flow. In this integral formation the central body is shaped by being dished or domed to provide for improved flow characteristics. Alternatively, the vanes may be formed from a flat sheet which will have a central flat circular portion although to improve the flow characteristics, a domed member may be secured thereover to complete the central body portion and, in such instance, the central flat portion may be cut-out or omitted so that the blades effectively extend from an annular ring portion with the central aperture being closed by the domed member secured thereover.

The vanes are preferably all inclined in the same direction downstream relative to the leading portion of the main body which, as mentioned is preferably a dome shaped cental portion, and a guide sleeve is located at the radially inner edges of the vanes coaxially with the central circular body so as to provide for additional guidance of gas flowing over the vanes.

The vanes are arranged about the central body portion to provide for balanced and stable seating in the separator housing and preferably also for even flow of deflected gases. The vanes are preferably located on a circular central body portion and are symmetrical about a diameter thereof. The length of the vanes and their inclination will normally be determined by the dimensions of the seating for a particular separator size and such will have been selected for optimum performance. The number and consequently the arrangement of the vanes for different deflecting means for a particular separator are determined to suit particular flow requirements.

The deflecting means is located in the inlet region of a centrifugal separator housing and preferably rests on the shoulder of a seating recess and is clamped in position by a portion of an inlet coupling member which is secured to the main body of the housing. The outermost edges of the vanes have slight clearance from the outermost walls of the seat to permit ready location and replacement of the displacing means.

In a preferred embodiment, improved deflecting means for use in a centrifugal separator comprises a central body portion of stainless steel having a central dome portion with a continuous surface and a plurality of integral vanes each extending by means of a connecting arm portion from a peripheral region of said dome portion and being bent downwards in a direction away from said dome and having arcuate radially inner and outer edges, and a cylindrical guide sleeve coaxially arranged with respect to the axis of said dome and the circles on which the arcs of the arcuate vane edges are formed; said sleeve having an outer surface adjacent or abutting against the inner arcuate surfaces of the vanes and being secured to a transition region between the dome portion and the vanes, and said sleeve extending at least to the edge of the vanes axially furthermost from said dome. The deflecting means is clamped in a seat between components of a separator body so that it is held axially and against rotation whilst retaining the desired vane inclination but it is readily removable from the seat upon release of the clamping means.

The invention will be described further, by way of example, with reference to the accompanying drawings, in which:

FIG. 3 is a side elevation showing a central body with a deflecting portion of a vane bent downwards after sheering but prior to dishing of the central body portion;

FIG. 4 is a plan view of FIG. 3 showing the central body and vanes produced by substantially L-shaped cuts producing portions arranged to permit six vanes to be bent therefrom, and is shown prior to shaping of the central portion;

FIG. 5 is a plan view of an alternative vane arrangement prior to shaping of the central portion wherein eight vanes are provided;

FIG. 8 is a cross section through an alternative embodiment of deflecting means located in a seat of a centrifugal separator.

Figure 1:
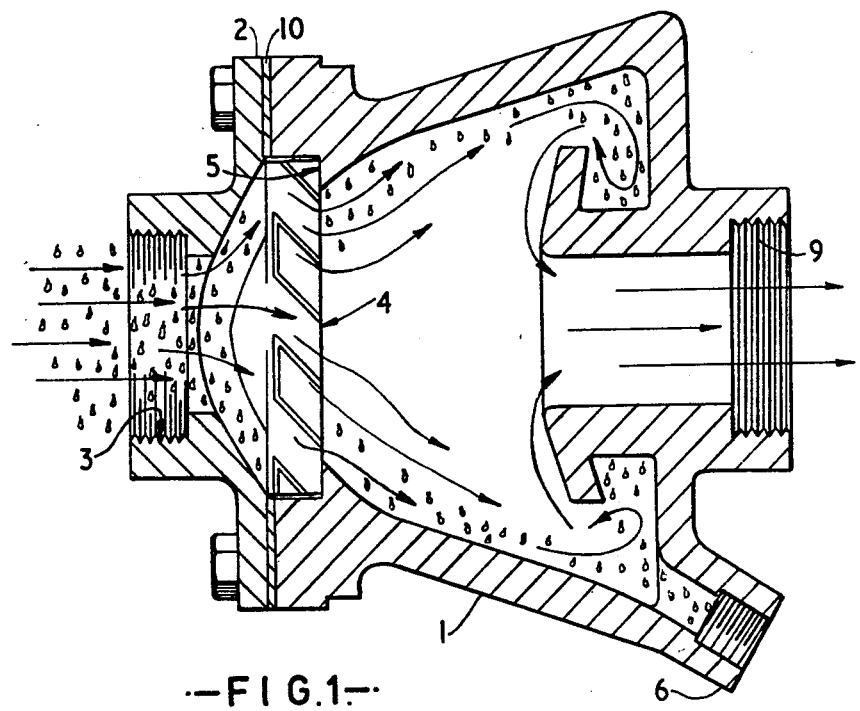
FIG. 1 is a schematic illustration of a deflecting means in a centrifugal separator housing.
Figure 2:
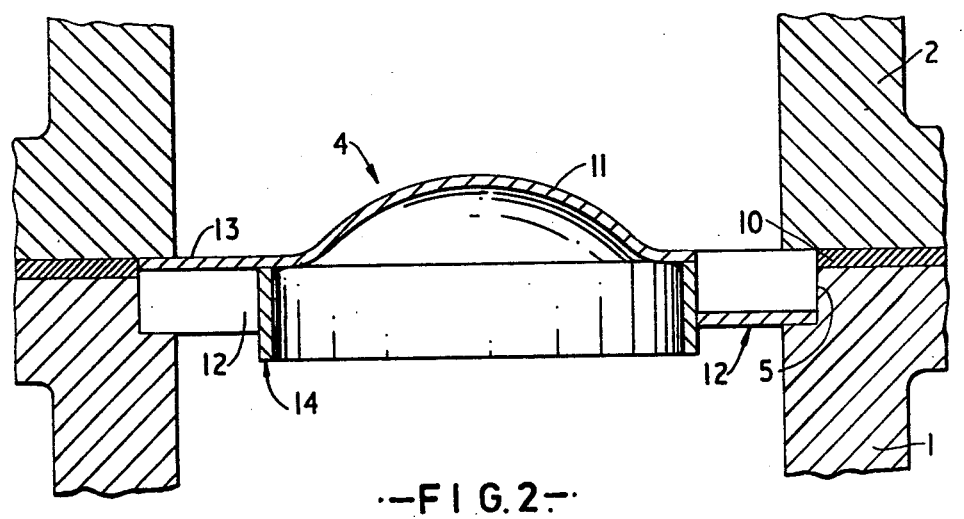
FIG. 2 is a cross section through a preferred embodiment of a deflecting means seated in the inlet of the housing of a centrifugal separator.

The centrifugal separator of FIG. 1 comprises a main housing 1 having a coupling and clamping member 2 bolted thereto via a flange and providing a threaded inlet socket 3 and acting to clamp deflecting means 4 in a seat 5 — deflecting means 4 being illustrated schematically but shown more clearly in FIGS. 2 and 8. A threaded drain outlet 6 formed by a boss is provided for removal of material in known manner. A threaded outlet socket 9 is provided for the separator. Flange connections may be provided on the inlet and outlets of the separator in place of the threaded sockets 3 and 9 where alternative coupling is required in known manner.

The embodiment shown in FIG. 2 comprises clamping member 2 bolted to main housing 1 and clamping deflecting means 4 in seating recess 5 provided with a peripheral seal 10. The deflecting means 4 comprises a central domed portion 11 formed from spun or pressed stainless steel. A plurality of vanes (12) (only two shown) are symmetrically arranged around the circular periphery of the dome 11 and formed by being cut from the material along arcs co-axial with the axis of the dome and having supporting arm portions 13 leading to the free deflecting portions 12 of the vanes. The deflecting portions 12 are bent to form the desired airflow. A cylindrical sleeve 14 also of stainless steel and formed by rolling from strip and welding, is welded to the inner ends of arms 13 in the transition region with the dome portion 11 and abuts the inner arcuate edges of the deflecting portions 12 to act as an inner guide surface for gas passing over the vanes.

Figure 6:
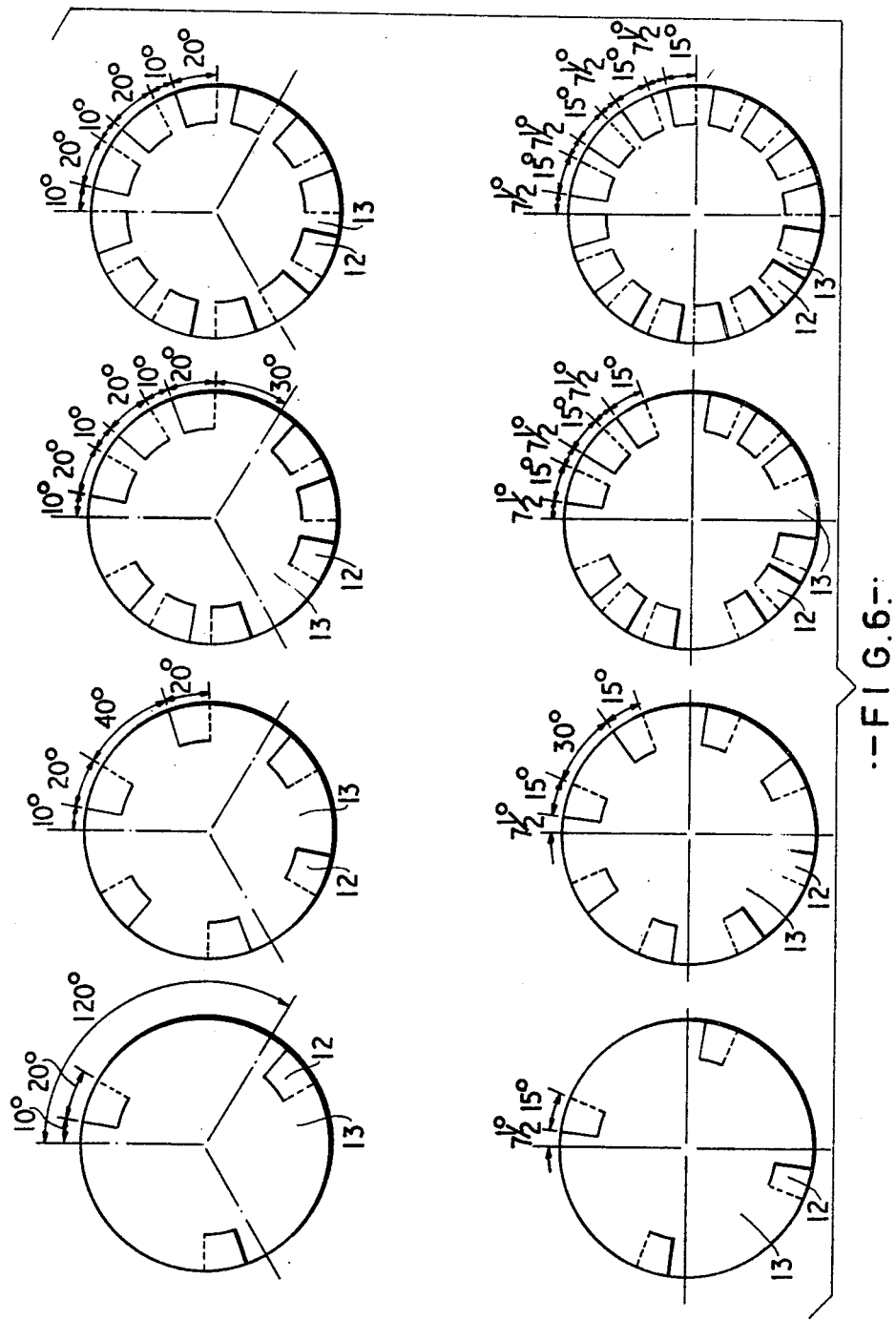
FIGS. 6 and 7 are illustrations of different vane arrangements of the deflecting means.
Figure 7:
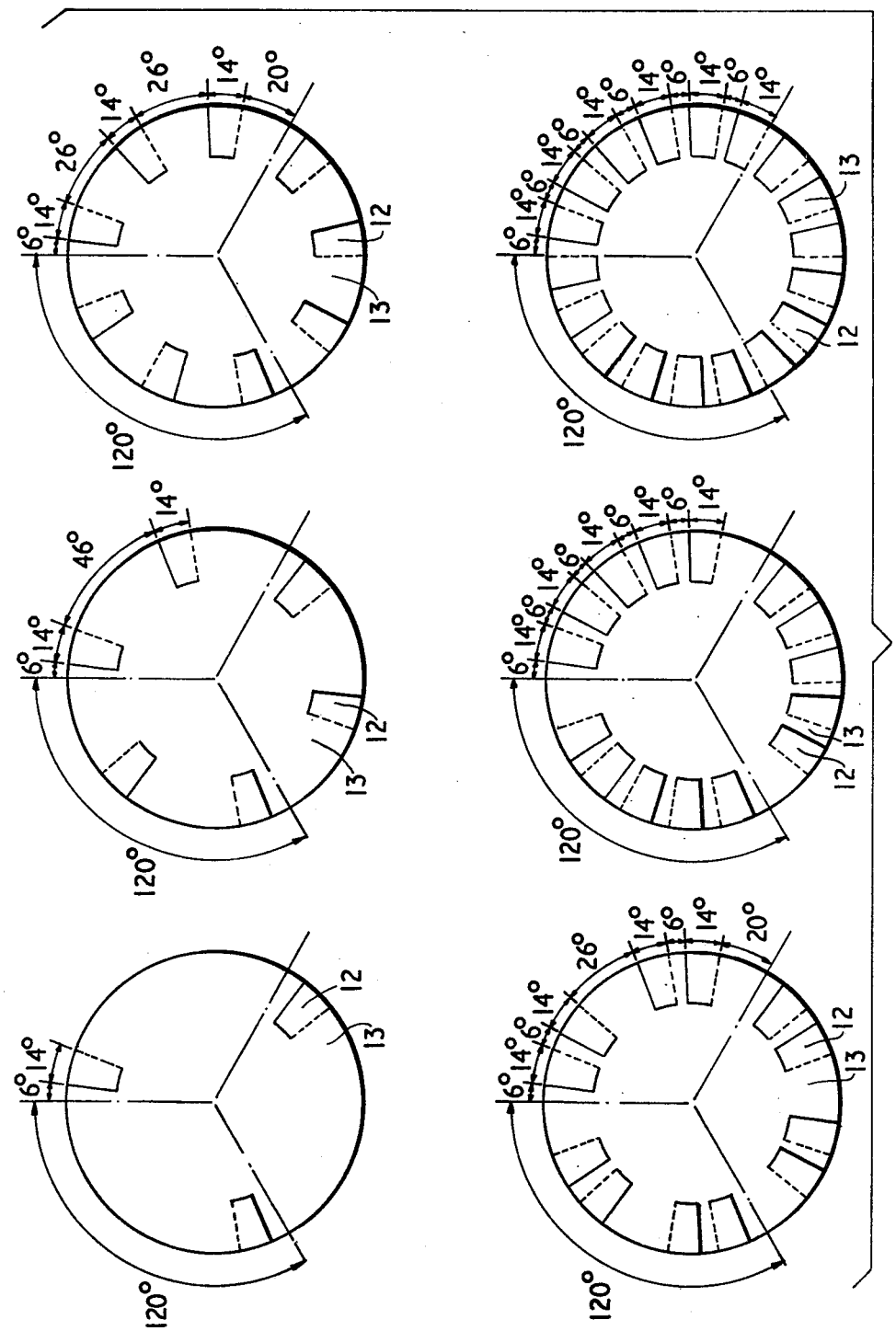

The arrangements of FIGS. 3 to 7 should be self-evident having regard to the foregoing and such are examples of possible vane arrangements. The inclined deflecting portions of the vanes are bent along the dotted lines away from the substantially flat supporting arm portion. Where it is desired to cut-out and bend a lesser or greater number of vanes than shown, it is necessary to ensure a symmetrical arrangement of the vanes about a diameter to provide for stable seating of the deflecting means. The upper row of vane arrangements of FIG. 6 provides for three, six, nine and 12 vanes whilst the lower row provides for four, eight, 12 and 16 vanes. The rows of FIG. 7 provide for three, six, nine, 12, 15 and 18 vanes — arrangements being also dependent on diameters required.

In the embodiment of deflecting means in FIG. 8, the vanes (12) are formed from a plate member 15 and a pressed dome member 16 is secured to plate member 15 at its periphery by welding. A cylindrical guide sleeve 17 is also welded to plate member 15. A major central portion of plate member 15 may be removed and used for other purposes in the interests of economy.

In both the embodiments illustrated the deflecting means and the seat therefor are so shaped and dimensioned with respect to each other and the seal, that when the clamping member 2 is secured in position the vanes are flexed and, by virtue of the spring nature of the material, the displacing member is secured against rotation on the shoulder of the seat 5 and yet has sufficient clearance from the outer walls of the seat to permit removal of the displacing means from the seat when the clamping member 2 is removed.

I claim:
1. A centrifugal separator for removal of impurities from gases, comprising:
   a. a housing having a pair of opposite end walls forming a chamber therein;
   b. an air inlet in one of said end walls, and an air outlet in the other of said end walls;
   c. a drain outlet for impurities in said housing adjacent said air outlet;
   d. deflecting means positioned in said housing adjacent said inlet and wherein the portion of the housing between said deflecting means and said outlet from the major portion of the housing;
   e. said deflecting means comprising:
      1. a central substantially circular body having a convex surface thereon forming a dome extending towards said inlet for improving gas flow characteristics;
      2. a plurality of vane means extending from the periphery of said body and having portions bent to extend into the major portion of said chamber toward said outlet for deflecting gases passed thereover and creating a vortex flow in said housing;
      3. means for securing said deflecting means, including said vanes in seating means in said housing;
      4. a cylindrical guide sleeve affixed to said central body extending into the major portion of said chamber, said sleeve being positioned substantially at the radially inner edges of said vanes and coaxial with said central body whereby additional guidance of gas flowing over the vanes is provided.

2. A centrifugal separator as defined in claim 1 wherein each of said vanes, prior to the deflecting portion being bent into the deflecting position, including:
   a. a first outer, arcuate peripheral edge,
   b. a second inwardly extending edge extending from one end of said outer edge to a third edge,
   c. said third edge being an inner arcuate edge extending substantially concentrically and over the same arc as said outer edge,
   d. a fourth edge extending inwardly from said outer edge to and connected with said central body.

3. A centrifugal separator according to claim 2, wherein the vanes are each bent at the same inclination along radii each of which radius extends to the end of the third edge adjacent the fourth edge of each said vane.

4. A centrifugal separator according to claim 1, wherein the central body of the deflecting means is formed from three parts welded together; a first part comprising a central circular flat body portion having said vanes extending therefrom, a second part comprising a central domed member forming said convex surface and welded to the first part along the circumference where the vanes join said circular body portion, and a third cylindrically tubular part forming said guide sleeve welded to the first part on the side of said body portion opposite that on which said second part is fixed and welded along the circumference where the vanes join said circular body portion.

5. A centrifugal separator according to claim 1, wherein spaced apart groups of said vanes of the deflecting means are symmetrically arranged about a diameter of the central body portion to provide for balanced and stable seating of the deflecting means.

6. A centrifugal separator according to claim 1, wherein the central body of the deflecting means is formed from two parts welded together, a first part comprising a central circular domed body portion having vanes integrally formed therewith and extending from the periphery thereof, and a second tubular and cylindrical part forming said guide sleeve and being welded to the first part along the circumference of the domed body portion where the vanes join said body portion.

7. A centrifugal separator according to claim 1, wherein the central body of the deflecting means is formed from three parts welded together; a first part comprising a central circular flat body portion having said vanes extending therefrom, a second part comprising a central domed member forming said convex surface and welded to the first part along the circumference where the vanes join said circular body portion, and a third cylindrically tubular part forming said guide sleeve welded to the first part on the side of said body portion opposite that on which said second part is fixed and welded.

8. A centrifugal separator according to claim 1, wherein the central body of the deflecting means is formed from two parts welded together, a first part comprising a central circular domed body portion having vanes integrally formed therewith and extending from the periphery thereof, and a second tubular and cylindrical part forming said guide sleeve and being welded to the first part along the circumference of the domed body portion where the vanes join said body portion.

* * * * *